Jan. 14, 1964  A. I. ROMAN  3,117,744
ROTARY WING ALIGHTING DEVICES

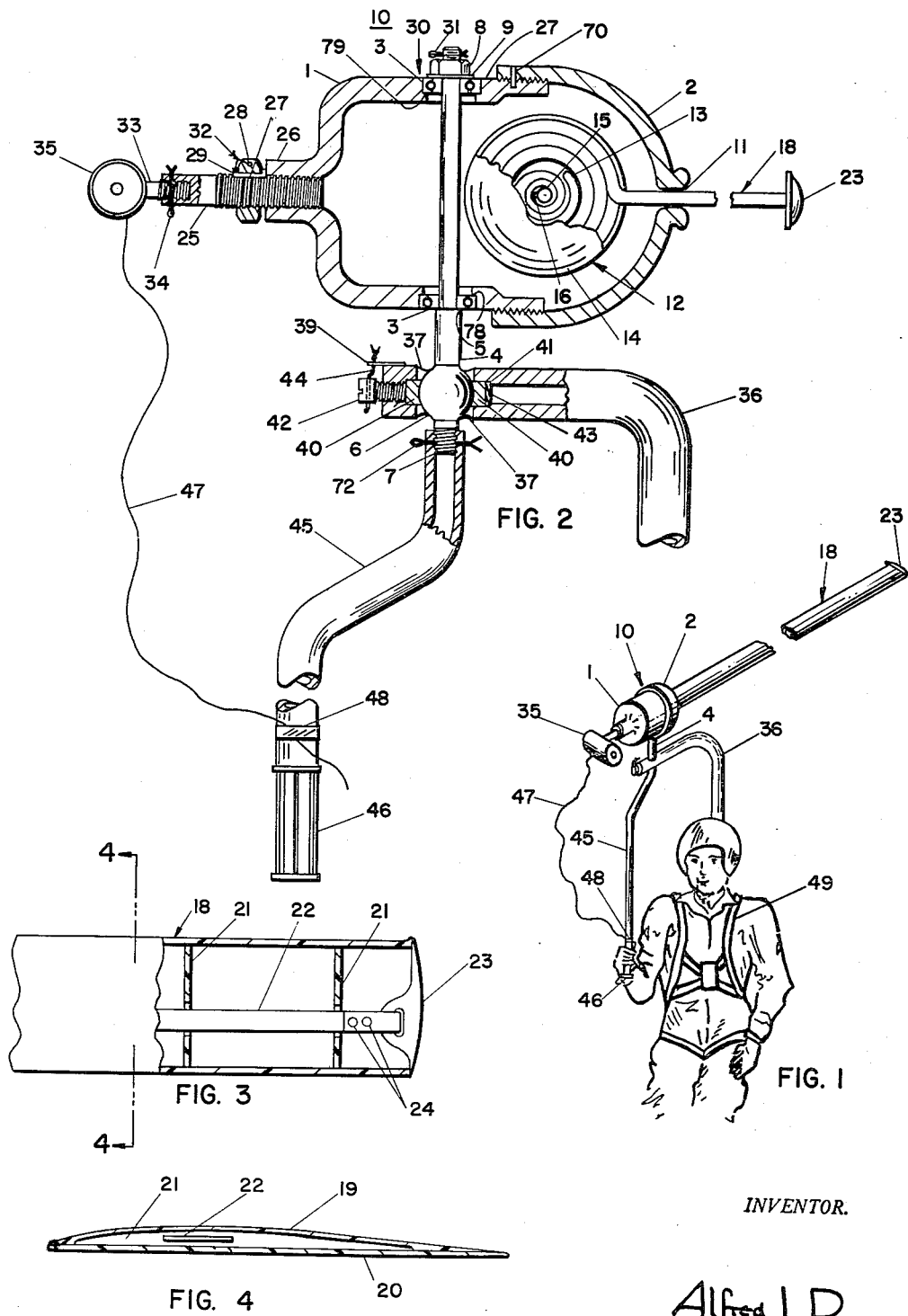

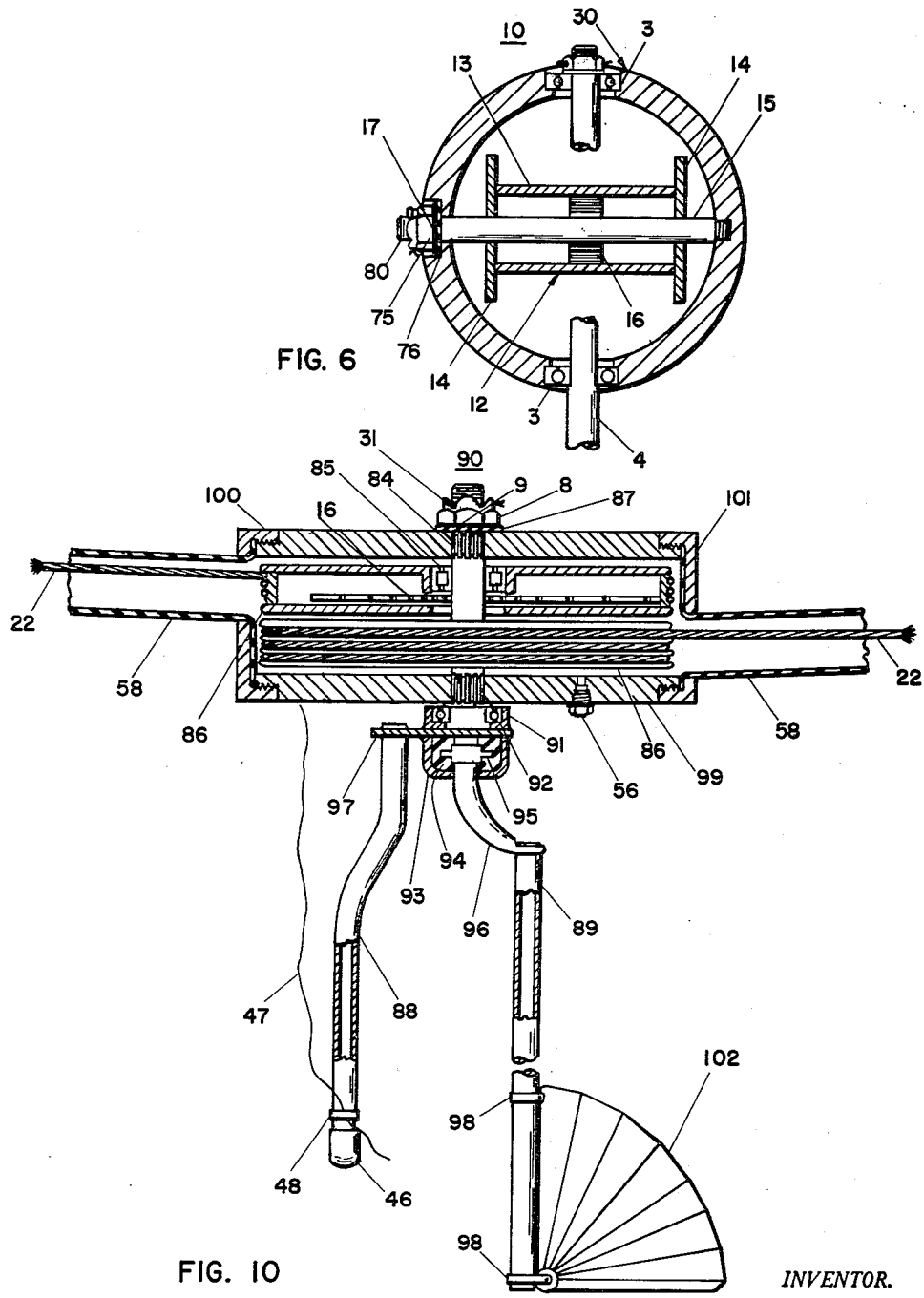

Filed Feb. 15, 1960  3 Sheets-Sheet 3

INVENTOR.

Alfred I. Roman

United States Patent Office 3,117,744
Patented Jan. 14, 1964

3,117,744
ROTARY WING ALIGHTING DEVICES
Alfred I. Roman, Willard, Utah
(11 Riverside Drive, New York, N.Y.)
Filed Feb. 15, 1960, Ser. No. 8,880
24 Claims. (Cl. 244—4)

The present invention relates to motorless aircraft, particularly of the rotating-wing type, wherein auto-rotating airfoils are substituted for a canopy-type parachute for safely and gently lowering personnel from flying aircraft to the ground, or to enable persons to leap over high obstacles, or with minor modifications, it may be used to check the vertical rate of descent of freight and equipment dropped from aircraft, or it may be used in towing; sustaining a cargo towed by an aircraft and lowering the cargo safely to the ground, when its destination is reached, or it may be used to decrease the landing speed of aircraft and reduce their landing roll by serving as a brake, or it may be used to retard the speed of missiles or sections of them to permit recovery without damage, or it may be incorporated in Convertible Aircraft and VTOLS, a form of aircraft which can take off and land vertically and hover, like a helicopter and in horizontal flight, operate in a manner similar to conventional airplanes. In a machine of this type, it is desirable to have a large diameter rotor or propeller for vertical takeoffs and landings, as well as for hovering, but a smaller diameter screw is more efficient in horizontal flight. The incorporation in the design of such aircraft of a device as herein described, would make feasible increasing the engine or rotor speed, which would result in greater centrifugal forces that would extend the blade or blades. For forward flight, the r.p.m. would be reduced, permitting the blades to be partially retracted, thus reducing the rotor diameter.

This invention is superior to conventional parachutes in its controllability, which comprises directional control and control of angle or rate of descent, and its automatic retraction upon landing, offering very much greater safety.

Parachute jumpers are now at the mercy of the winds and may be blown against obstructions, into bodies of water, or into enemy territory. Even after landing, a jumper may be dragged by his parachute on a windy day, but this invention makes safe descent and landing possible, regardless of weather conditions. In addition, it permits leaving aircraft at very much lower altitudes than can safely be done with conventional parachutes and not only eliminates the violent jerk experienced by parachutists upon the opening of their parachutes, but also any pendulous motion during descent.

This invention also may be used for competitive sport, as in trying to land within a marked area or in concentric circles, or in avoiding obstacles, or in striving to travel the greatest distance before touching ground.

Other advantages of this invention over conventional parachutes are its greater durability and elimination of packing.

A further object of this invention is the provision of rotor blades which are flexible and bendable along their span, to permit wrapping around a drum, but which are resistant to chordwise bending, in order to preserve optimum aerodynamic characteristics.

A further object of this invention is the provision in a rotor having flexible extendable and retractable blades of a construction wherein the blade sections equally and progressively extend as the rotor speed increases.

A further object is the provision of a positive means of retraction for the rotor blades when the rotor speed of rotation decreases.

A further object is the provision of a rotor which may be directionally controlled during the descent.

A further object is the provision of a rotor with controllable angle and rate of descent.

A further object is the provision of a rotor which may be launched from an aircraft flying at high velocities.

A further object is the provision of a rotor which may be launched from aircraft flying very close to the ground.

A further object is the provision of a rotor which will automatically retract upon reaching the ground, eliminating hazards due to the wind and preventing injury and damage.

According to the present invention, there is provided a rotating wing device which comprises, generally, a rotatable hub associated with an airfoil rotatable with the hub. The airfoil is flexible along its span, that is, bendable, pliant and limber, but is comparatively stiff or resistant to bending along its chord, so that optimum aerodynamic properties are preserved. A torsion or spring means is connected between the rotatable hub and the airfoil to continuously exert a torque to retract the airfoil so that retraction of the airfoil occurs whenever the centrifugal force on the airfoil falls below a predetermined level. In addition, apparatus is provided to initially rotate the hub to quickly establish the centrifugal force necessary to overcome the torque of the spring means and place the airfoil in an extended position. The airfoil is freely extendible or retractable, depending upon the relative magnitude of the spring torsion and centrifugal forces and in effect, tends to "hunt" for a position where these forces are balanced. In one embodiment of the invention, the means for rotating the hub conveniently takes the form of a gas generator or rocket which may be actuated to rotate the hub, almost instantaneously, at a speed sufficiently high to completely extend the airfoil.

The operation of the present invention is somewhat similar to the operation of a helicopter or autogiro whose blades are auto-rotating, and has the advantage over conventional canopy-type parachutes of being controllable.

A person jumping from an aircraft with the present invention attached to him, by means of a harness or the like, need only actuate the gas generator or rocket in order to initiate high-speed rotation of the rotor hub. This rotation of the hub produces centrifugal forces which act on the airfoil and extend it radially outwardly to a position where the airfoil can autorotate. Such auto-rotation occurs by reason of the aerodynamic forces on the airfoil, as is well known in the art, and the high centrifugal forces produced maintain the airfoil in substantially rigid extension. The windmilling or auto-rotation of the airfoil produces lift forces which slow the descent of the airman. The gas generator used need only be of relatively small capacity, since it is used primarily to initiate extension of the airfoil, the airfoil thereafter auto-rotating during the descent.

The present invention also includes a control element which is attached to the rotatable hub in such a fashion that the airman can tilt or pivot the hub to thereby alter the rotational plane of the airfoil. This affords a directional control, as well as control of angle of descent or rate of descent for the airman.

One form of airfoil of the present invention comprises a longitudinally pliant member of thin cross section, which preferably includes a tension element made of steel or the like and which is embedded or otherwise secured to the airfoil. The tension element provides a means for retracting the airfoil and also provides tensile strength in a spanwise direction for resisting high centrifugal forces. Another form of airfoil of the present invention is inflatable, and includes for this purpose a hollow flexible chamber having stiffening ribs disposed therethrough for strengthening the airfoil against bending along its chord, an inflating means for inflating the airfoil, a gas generator for initially rotating the hub at a speed sufficiently high to hold the airfoil in a substantially rigid position and a seal to render the chamber formed by the hub and airfoil gas tight.

The retraction of the airfoil is accomplished in a manner similar to that of the non-inflatable airfoil, with the addition of a pressure relief valve, which is provided to vent the air or gas from the airfoil chamber, to prevent the pressure from building up as the volume of the chamber is decreased during the retraction operation. In the event of over-pressure, this valve would automatically open, relieve the pressure to the desired level and then close. This feature is useful in permitting immediate retraction of the airfoil once the airman has reached the ground, thereby preventing injury to him and damage to the alighting device. The inflatable airfoil also differs from the non-inflatable type in not being coiled on a drum when it is retracted, but folds against the hub during this operation.

Other objects and features of the present invention will be readily apparent to those skilled in the art from the following specification and appended drawings wherein is illustrated a preferred form of the invention and in which:

FIGURE 1 is a perspective view of one embodiment of the invention as worn by anyone leaving a flying aircraft.

FIGURE 2 is an elevation, partially in section of the device of FIGURE 1.

FIGURE 3 is a plan view of the airfoil, partially in cross-section.

FIGURE 4 is a sectional view taken along line 4—4 of FIGURE 3.

FIGURE 6 is a cross-sectional end view of the rotor hub, taken on a vertical cutting plane through the center of the spool.

FIGURE 10 is an elevation, partially in section, of another form of rotor hub for inflatable airfoils.

Figure 8:
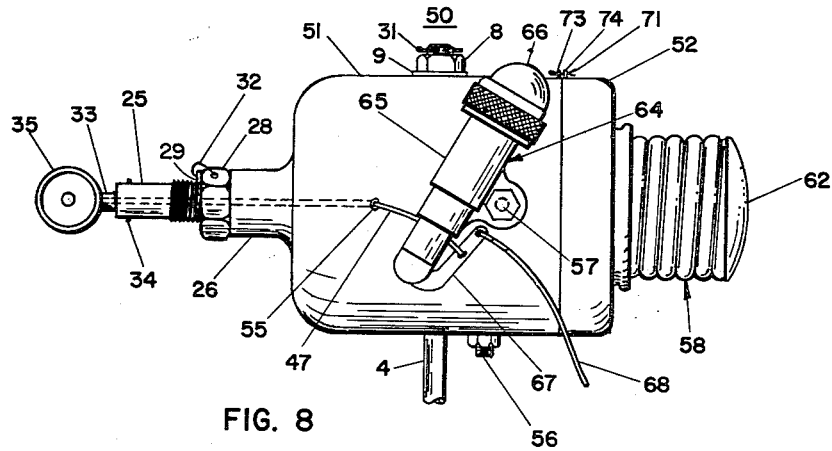
FIGURE 8 is an elevation of the device of FIGURE 7, with the inflatable airfoil in the retracted position and showing the inflating mechanism.

Referring now to the drawings, and particularly FIGURES 1 through 4, there is illustrated a controllable rotor 10 comprising, generally a rotatable mounting means or hub 30; an airfoil 18 rotatable with hub 30, and which is adapted to be extended from and retracted within hub 30; a torsion means or spring actuated spool 12, which is adapted to reel in or retract airfoil 18 when the centrifugal forces imposed upon airfoil 18 by rotation of hub 30 decrease to a predetermined level; and a means for initially rotating hub 30, the means conveniently taking the form of a gas generator or rocket 35 which is adapted for securement to hub 30; a support element 36, which is made of a suitable material such as metal tubing, and which is adapted to be secured to the harness worn by the airman; a shaft 4 connected between element 36 and hub 30 to permit relative tilting therebetween; and a control element 45 which is secured to shaft 4 for tiling hub 30 with respect to support element 36 for directional control of rotor 10, as will be seen.

Although the present invention is adapted to provide controlled descent for various types of loads, such as cargo, emergency supplies, aircraft, missiles and the like, it is particularly suited for use by, and will be described hereinafter in connection with flying personnel, such as paratroopers, and the manner in which the descent of such personnel may be controlled by rotor 10.

Rotor 10 is compact, light in weight, easily carried by a paratrooper and provides a reliable, easily operated and safe means of escape from an aircraft.

For ease of assembly and maintenance, hub 30 is preferably made in two sections, 1 and 2, which are secured by screwing together, or other suitable means. Section 1 tapers to end 26, which is internally threaded, and is also threaded at its opposite end 27 of larger diameter. Section 2 has an opening with lip 11 and an oppositely disposed threaded opening which is screwed to section 1. Pin 70 secures sections 1 and 2 against unscrewing. Section 1 also has a pair of vertically aligned openings in its upper and lower walls and a pair of bearings 3 fitted therein, which rotatively support section 1 on shaft 4. Shaft 4, which is threaded at its opposite ends, is tiltably supported in member 36 by means of its spherical section 6 and bearings 40 and extends through vertically aligned openings 37 in support member 36. Shoulder 5 on shaft 4, with nut 8, washer 9 and locking pin or wire 31 together with shoulders 78 and 79 in section 1, locate hub 30 in position upon shaft 4, and retain bearings 3 in section 1.

Gas generator or rocket 35, which is provided to impart initial rotation to hub 30, also serves, together with extension 25, as a counter-weight, where a single airfoil is employed with hub 30. Extension 25 is screwed into threaded end 26 of section 1 to provide an adjustment for securing the proper radius arm for counterbalancing the rotating masses. One method for preventing the unscrewing of extension 25 from end 26 is the providing of axially extending groove 27 in extension 25, for slidably accommodating locking key 29, jam nut 28, which is threadably advanced into abutment with end 26 of section 1 and safety wire 32 secured between nut 28 and locking key 29; but this method of securement is not critical to the present invention. Although various means for attaching rocket 35 to hub 30 may be utilized, extension 25 has a threaded end oppositely disposed from the threading accepted by end 26 of section 1, to engage threading on boss 33, which is integral with rocket 35. Rocket 35 is properly oriented with respect to hub 30 by locking pin or wire 34, which is disposed through aligned openings in the mating ends of extension 25 and boss 33.

Rocket 35 may be any form of gas generator which is adapted to effect a propulsive force upon the structure to which it is attached, and in the present invention preferably takes the form of one of the commercially available rockets or gas generators which include a solid propellant and an ignitor section actuated by percussion. Such rockets usually include a spring-loaded percussion element which may be tripped or released by pulling a lanyard or cord. The percussion element is then driven at high velocity into an explosive cap which initiates burning of the main propellant charge. Since the details of such rockets are well known in the art, no further explanation thereof is considered to be necessary.

A cord or lanyard 47 for actuating the ignition device of rocket 35 is attached at its upper end to the ignition device and its lower end is releasably held to the section of control column 45 adjacent handle 46 by means of a tearable collar or tape 48, which holds cord 47 within easy reach of the paratrooper when descending from the aircraft.

Referring now to FIGURE 1, it will be seen that support member 36 is securely carried by the usual harness 49 strapped to the body of the paratrooper and that control element 45 extends downwardly to a position where it may conveniently be held by the paratrooper at a handle grip 46. The upper end of control element 45 is threaded for securement to the threaded lower end of shaft 4 and a locking pin 72 is disposed through aligned openings provided in shaft 4 and control element 45 to prevent these elements from unscrewing.

Support member 36, which is made of strong, light weight tubing of suitable material, has the oppositely disposed openings 37 through which shaft 4 extends, lug 39 secured to its horizontal end by welding or other suitable means, internal threads adjoining the same end, internal shoulder 41 and means for attachment to harness 49. Bearings 40 in member 36 tiltably support shaft 4. Inner bearing 40 abuts against compression spring 43, which is seated against shoulder 41 and outer bearing 40 is urged against ball section 6 by plug 42, which is threaded to engage the threads in element 36. Plug 42 is secured against unscrewing by locking wire or pin 44 which is passed through holes in plug 42 and lug 39.

The form of pivotal connection between hub 30 and support member 36 is not critical to the present invention and may comprise any suitable means for permitting relative movement between hub 30 and support member 36, such as yieldable rubber mounting of shaft 4 to element 36 as shown in FIGURE 10. If desired, a linkage means may be provided between control column 45 and shaft 4 for tilting hub 30 in the same direction as control column 45.

Airfoil 18, as shown in FIGURES 3 and 4 comprises an outer skin or wall made of a lithe, flexible or pliant material such as flexible nylon, polyethylene, rubber, rubber impregnated cloth or any other suitable material, which may be continuous, or formed of an upper section 19 and lower section 20, which are joined together by bonding or any other suitable means.

The outer skin is stiffened in a chordwise direction by a plurality of longitudinally spaced ribs 21 which are joined to sections 19 and 20 by bonding or any other suitable means. Thus, airfoil 18 is very flexible and bendable along its span, but is substantially rigid along its chord to obtain maximum aerodynamic efficiency from its airfoil contour. By incorporating a thin airfoil section, or one of shallow depth, airfoil 18 may easily be wound on drum 12 during retraction. Airfoil 18 includes a weighted outer or tip element 23, which may be formed integrally with airfoil 18 or which may be formed separately and secured thereto in any suitable fashion. Tip element 23 is formed to seat against opening 11 in hub 30, when airfoil 18 is in its fully retracted position, to thereby seal opening 11 against dirt and foreign matter.

A tension member, such as a steel tape 22 extends longitudinally through the interior of airfoil 18 by passing through aligned openings in each of the ribs 21 and is secured to tip closure 23 in any suitable fashion, as by looping it about a section of element 23 and securing tape 22 to itself by rivets 24. Thus, tape 22 strengthens airfoil 18 longitudinally, for withstanding high centrifugal forces and provides a convenient means for retraction of the airfoil.

FIGURE 6 shows how spool 12, comprising drum 13 and end plates 14, is rotatably mounted on shaft 15, which is supported in hub 30 and secured against rotation by means of a threaded end which is screwed into mating threads in the wall of hub 30, and by nut 75, washer 17 and pin or wire 80. Sealing washer 76 is used only for inflatable airfoils. Coiled spring 16, in drum 13, has one end secured to drum 13 and its opposite end secured to shaft 15 by any suitable means, so that as airfoil 18 is extended by rotation of hub 30, causing spool 12 to rotate in a clockwise direction, spring 16 is wound up, applying a force resisting the clockwise rotation of spool 12 and tending to rotate the spool in the opposite direction.

Figure 5:
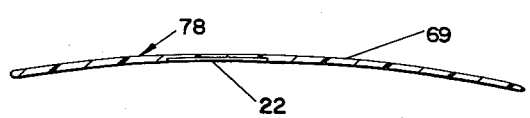
FIGURE 5 is a sectional view of another form of airfoil.

The inner ends of tape 22 and airfoil 18 are secured to drum 13, so that rotation of drum 13 in a counter-clockwise direction retracts or reels in airfoil 18. FIGURE 5 illustrates another type of airfoil formed of a suitable flexible sheet material 69 into a chordwise arc-shaped contour 78, in which tape 22 is embedded or adhesively bonded.

The operation of the invention as described is as follows:

The paratrooper about to leave an aircraft in flight, attaches member 36 to the parachute-type harness he wears, grasps grip 46 of control element 45 with his right hand and exits from the aircraft, tearing off tape 48 from element 45 by pulling cord 47 with his left hand. By applying further tension to cord 47, rocket 35 is actuated, rotating hub 30. When the centrifugal force on tip element 23 and airfoil 18 exceeds the tension in spring 16, element 23 will be drawn away from opening 11 and as it moves outwardly, cause airfoil 18 to unwrap from spool 12. When airfoil 18 is inclined at the proper angle, by manipulating control element 45, it will auto-rotate under the influence of aerodynamic forces, becoming independent of rocket 35 and generating sufficient lift to gently lower the wearer of the device.

The aerodynamic forces result from the wind velocity, the downward velocity or rate of descent of the device and the speed of rotation of the airfoil, which induce a lifting force. A forward-acting component of the lifting force drives airfoil 18 forwardly, so that it rotates hub 30 about shaft 4, or auto-rotates. Rocket 35 operates for only a few seconds to permit airfoil 18 to attain auto-rotation and may be replaced by a unit with a fresh charge of propellant after each descent.

When the paratrooper makes contact with the ground, the speed of rotation of hub 30 will be substantially reduced because of the termination of vertical motion, the tension in spring 16 will exceed the centrifugal force acting upon tip 23 and airfoil 18, retracting the airfoil by causing spool 12 to rotate in a counter-clockwise direction. This retraction will protect the paratrooper from being dragged by the device when there are winds at the surface of the ground.

Figure 7:
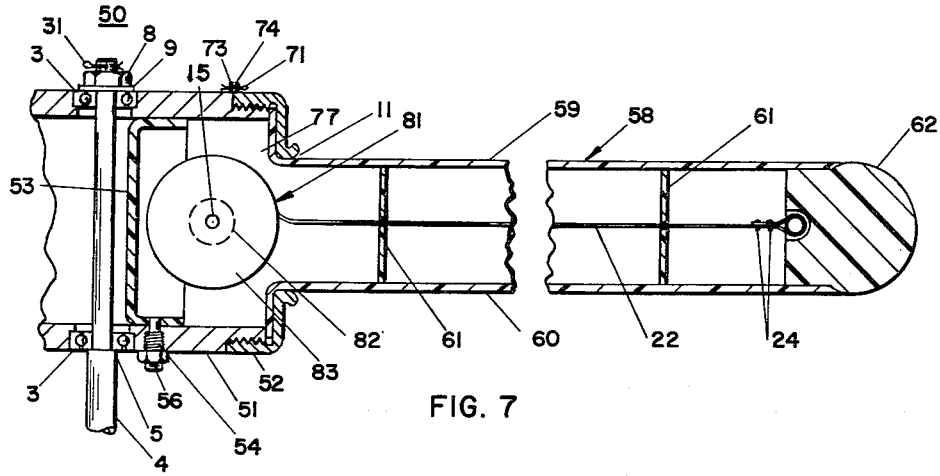
FIGURE 7 is a sectional view of another embodiment of this invention using inflatable airfoils.

FIGURES 7, 8, 9 and 10 show another form of this invention wherein the airfoil is inflatable. Referring to FIGURE 7, hub 50 comprises sections 51 and 52 which are similar to sections 1 and 2, respectively, of FIGURE 2, and are secured in like manner. Lugs 73 and 74 and locking wire 71 secure sections 51 and 52 against unscrewing. Section 51 has the addition of holes 54, 55 and 57, hole 54 being screw-threaded to accommodate pressure-relief valve 56, which is a type known to the art, and is provided with seal 53. Parts attached to section 51 correspond to the parts of similar numbers attached to section 1 of hub 30. Seal 53, made of a suitable material, such as rubber or plastic, is bonded to the inside of section 51, forming with airfoil 58 gas tight chamber 77.

Inflatable airfoil 58 comprises an outer skin or wall, which may be continuous or formed of an upper surface 59 and lower surface 60, which are joined together by bonding or any other suitable means, chordwise stiffening ribs 61 to preserve an efficient airfoil section while permitting airfoil 58 to flex spanwise, end closure 62 secured to surfaces 59 and 60 by bonding or other suitable means, a tension member such as a steel tape or cable 22, which extends longitudinally through the interior of airfoil 58 by passing through aligned openings in ribs 61, and is secured to end closure 62 in any suitable fashion, as by looping it about a section of element 62 and securing member 22 to itself by rivets 24 or by splicing. Thus member 22 strengthens airfoil 58 longitudinally for withstanding high centrifugal forces and provides a convenient means for retraction of the airfoil.

Spool 81, consisting of drum 82 and end plates 83, is operated in a manner similar to spool 12 in FIGURE 2, but may be of much smaller size, since only tension member 22 is wrapped around it and airfoil 58 is drawn up and folded against the outer wall of section 52, when it is retracted and deflated.

When sections 51 and 52 are screwed together, the portion of the surfaces 59 and 60 of airfoil 58, which extend between 51 and 52 are compressed, thereby sealing chamber 77 in hub 50 against the leakage of gas or air.

FIGURE 8 shows the attachment to hub 50 of device 64, which is a compressed air or gas cartridge container and puncturing device known to the art. Device 64 comprises the holder 65, removable head 66, which holds the cartridge in holder 65 and lever 67 which is pivoted in holder 65. Device 64 is mounted upon hub 50 and connects with chamber 77 by means of manifold 57. When the paratrooper pulls cord 68, lever 67 is swung downward, puncturing the cartridge of compressed gas or air with its end contained within holder 65. The escaping gas or air passes through manifold 57, into chamber 77 in hub 50, inflating airfoil 58. One end of cord 47 is attached to the rocket ignition device and the other end is directly secured to arm 67, or the latter end may be passed through boss 33, extension 25, section 51, out through hole 55 in section 51 and secured to arm 67, so that the pulling of cord 68 for inflation of airfoil 58 applies tension to cord 47 through the motion of arm 67, thereby actuating gas generator 35. When the speed of rotation of hub 50 slows down, as upon landing, and the tension in spring 16 overcomes the centrifugal force on airfoil 58, retracting the airfoil, the gas contained within airfoil 58 and chamber 77 will be compressed by the reduction in volume of airfoil 58. As soon as the pressure of the gas reaches a predetermined value, pressure-relief valve 56 will operate so as to reduce the gas pressure sufficiently to permit a smooth and steady retraction.

Member 36 may be made foldable for convenience in stowage and portability and a fin may be attached to it if desired, to extend rearwardly, to preclude rotation of element 36 in a direction counter to that of hub 30 or 50.

Figure 9:
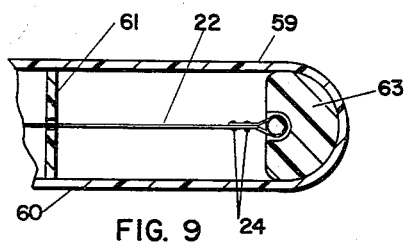
FIGURE 9 is a fragmentary sectional elevation of the tip end of the inflatable airfoil with another form of closure attached thereto.

FIGURE 9 illustrates a form of inflatable airfoil within which the end element 63 is completely contained and may be secured to surfaces 59 and 60 by bonding or other suitable means.

FIGURE 10 shows another form of this invention in the form of controllable rotor 90, wherein the airfoils are inflatable and the spools 86, which have threaded drums for accommodating cables 22, are rotatably mounted on bearings 85 fitted on the hub shaft 84, which is secured to the hub to rotate with it.

Washers 87, which may be rubber, plastic, or any other suitable material serve to seal hub 90 against leakage of air or gas. Bearing 92 is mounted on the lower end of shaft 84 and in the cup 91, which is secured to plate 97 by welding or any other suitable means. Cup 93 is also secured to plate 97, in similar fashion and contains a resilient material 94, such as rubber. Fitting 95, to which the resilient material is bonded, is secured by any suitable means to the upper end of structural member 96, which is secured to structural member 89 by any suitable means. Control element 88 is also attached to plate 97 by any suitable means and fin 102 is secured to member 89 by means of brackets 98. All component parts of rotor 90 correspond to the component parts of like numbers of rotor 50. If desired, structural member 89 may be made foldable.

It is understood this invention is not limited to a single airfoil employed with a hub, as shown herein, but any number of airfoils may be employed.

It is also understood this invention is not limited to the airfoil shapes shown herein and that other shapes may be employed to achieve the desired results.

It is also understood this invention is not limited to a rocket employing a spring-loaded percussion igniting device, but an electrically ignited rocket may be employed to initiate rotation of the hub.

Having thus described my invention I claim:

1. A rotary-wing alighting device comprising a hub, a structural member rotatably supporting said hub, means for initiating rotation of said hub, means for actuating said hub rotating means, at least one retractable airfoil having lithe span-wise and stiff chordwise construction extending from said hub and secured, at its inboard end, to means counteracted by centrifugal force for permitting said airfoil to progressively extend from said hub as the centrifugal force increases, and for retracting said airfoil as said centrifugal force decreases, and means for attaching said structural member to the body of the alighting person.

2. A rotary-wing alighting device as defined in claim 1, wherein at least one airfoil is inflatable and a sealing means is provided in the hub to form a gas-tight chamber in said hub, connecting with each airfoil.

3. A rotary-wing alighting device as defined in claim 2, wherein at least one airfoil is inflatable and a sealing means is provided in the hub to form a gas-tight chamber in said hub, connecting with each airfoil.

4. A rotary-wing alighting device as defined in claim 3, wherein each inflatable airfoil comprises an outer skin or wall made of a lithe gas-tight material stiffened by a plurality of longitudinally disposed ribs, rendering said airfoil bendable along its span and stiff along its chord, the inboard end of said airfoil being secured to the hub, longitudinally aligned slots or openings in said ribs, a closure secured to the tip of said airfoil, a tension member secured to said hub at one end, extending longitudinally through the aligned openings in said ribs and secured at its other end to said tip closure.

5. A rotary-wing alighting device comprising a hollow hub, a structural member rotatably supporting said hub, means for initiating rotation of said hub, means for actuating said hub rotating means, at least one airfoil having lithe spanwise and stiff chordwise construction extending from said hub and secured, at its inboard end, to means counteracted by centrifugal force for permitting said airfoil to progressively extend from said hub as the centrifugal force increases, and for retracting said airfoil as said centrifugal force decreases, an opening provided in said hub through which said airfoil extends, a closure secured to the tip of said airfoil, for sealing said opening when said airfoil is completely retracted, a tension member extending longitudinally through said airfoil, secured to said retracting means at one end and secured, at its other end, to said closure, and means for attaching said structural member to the body of the alighting person.

6. A rotary-wing alighting device comprising a hollow hub, a shaft rotatably supporting said hub, a structural member tiltably supporting said shaft, means for tilting said hub relative to said structural member comprising a control element attached to said shaft, means for initiating rotation of said hub, means for actuating said hub rotating means, at least one airfoil having lithe spanwise and stiff chordwise construction extending from said hub and secured, at its inboard end, to means counteracted by centrifugal force for permitting said airfoil to progressively extend from said hub as the centrifugal force increases, and for retracting said airfoil as said centrifugal force decreases, an opening provided in said hub through which said airfoil extends, a closure secured to the tip of said airfoil, for sealing said opening when said airfoil is completely retracted, a tension member extending longitudinally through said airfoil, secured to said retracting means at one end and secured, at its other end, to said closure, and means for attaching said structural member to the body of the alighting person.

7. A rotary-wing alighting device as defined in claim 6, wherein the means for initiating rotation of the hub comprises a rocket attached to said hub and provided with ignition means actuatable by the alighting person.

8. A rotary-wing alighting device as defined in claim 7, wherein an extension arm is adjustably secured to the hub to provide a counterbalance of adjustable length for a single-bladed rotor and a convenient mounting means for the rocket.

9. A rotary-wing alighting device as defined in claim 8 wherein said means provided for retracting the airfoil comprises a spring-driven reel to which the inboard ends of said airfoil and tension member are secured, said reel including a spool and a spring element, one end of said spring element being secured against rotation with the spool; the other end being secured to said spool, so that said spring is wound in a state of tension by rotation of said spool, when said airfoil is extended by centrifugal force acting thereon, thus applying an opposing torque which tends to rotate said spool in the opposite direction, to retract said airfoil, the amount of extension or retraction being determined by the relative magnitudes of said centrifugal force and said opposing torque.

10. A rotary-wing alighting device as defined in claim 9 wherein a stabilizing means is provided to prevent rotation of the supporting member in a direction counter to that of the hub and airfoils, said means being in the form of a vertical tail surface secured to said supporting member.

11. A rotary-wing alighting device as defined in claim 10 wherein the supporting member is foldable for convenience in stowage and portability.

12. A rotary-wing alighting device as defined in claim 11 wherein the airfoils each comprise an outer skin or wall made of a lithe material stiffened by a plurality of longitudinally-disposed ribs, rendering the airfoil bendable along its span and stiff along its chord, the inboard end of said skin being secured to the reel and longitudinally aligned slots or openings in said ribs through which the tension member extends.

13. A rotary-wing alighting device as defined in claim 11 wherein each airfoil comprises a suitable flexible sheet material formed into a chordwise arc-shaped contour, the inboard end of each airfoil being secured to a reel, and the tension member secured to the reel at one end, extends longitudinally through said airfoil in which it is recessed or adhesively bonded and is secured at its other end to the closure secured to the tip of said airfoil.

14. A rotary-wing alighting device as defined in claim 12, wherein a linkage means is provided connecting the control element with the shaft, to tilt said shaft in the same direction as said control element.

15. A rotary-wing alighting device as defined in claim 13, wherein a linkage means is provided connecting the control element with the shaft, to tilt said shaft in the same direction as said control element.

16. A rotary-wing alighting device comprising a hollow hub, a shaft rotatably supporting said hub, a structural member tiltably supporting said shaft, means for tilting said hub comprising a control element attached to said shaft, at least one inflatable airfoil secured to the hub and extending through an opening provided therein, each airfoil comprising an outer skin or wall made of a lithe, gas-tight material stiffened by a plurality of longitudinally disposed ribs, rendering said airfoil bendable along its span and stiff along its chord, longitudinally aligned slots or openings in said ribs, a closure secured to the tip of said airfoil, a tension member secured to said hub at one end, extending longitudinally through the aligned openings in said ribs and secured at its other end to said tip closure, a sealing means provided in said hub to form a gas-tight chamber connecting with said airfoil, means for inflating said airfoil, said means being actuable by the alighting person, and means for attaching said structural member to the body of said person.

17. A rotary-wing alighting device as defined in claim 16, wherein means are provided for starting the rotation of the hub comprising a rocket attached to said hub and provided with ignition means, said ignition means being actuatable by the alighting person.

18. A rotary-wing alighting device as defined in claim 17, wherein an extension arm is adjustably secured to the hub to provide a counterbalance of adjustable length for a single airfoil and a convenient mounting means for the rocket.

19. A rotary-wing alighting device as defined in claim 18, wherein the means for actuating the ignition is connected to the inflation means to provide for simultaneous actuation of said ignition means and said inflation means.

20. A rotary-wing alighting device as defined in claim 19, wherein means are provided for retracting each airfoil comprising a spring-driven reel to which the inboard ends of each tension member is secured, said reel including a spool and a spring element, one end of said spring element being secured against rotation with the spool, the other end being secured to said spool, so that said spring is wound in a state of tension by rotation of said spool, when said airfoil is extended by centrifugal force acting thereon, thus applying an opposing torque which tends to rotate said spool in the opposite direction, to retract said airfoil, the amount of extension or retraction being determined by the relative magnitudes of said centrifugal force and said opposing torque.

21. A rotary-wing alighting device as defined in claim 20, wherein a pressure relief valve is provided to prevent the gas pressure from building up during retraction of each inflatable airfoil.

22. A rotary-wing alighting device as defined in claim 21, wherein a stabilizing means is provided to prevent rotation of the supporting structural member in a direction counter to that of the hub and airfoils, said means being in the form of a vertical tail surface secured to said supporting member.

23. A rotary wing alighting device as defined in claim 22, wherein the supporting structural member is made foldable for convenience in stowage and portability.

24. A rotary wing alighting device as defined in claim 23, wherein a linkage means is provided connecting the control element with the shaft, to tilt said shaft in the same direction as said control element.

References Cited in the file of this patent

UNITED STATES PATENTS

| 2,226,978 | Pescara | Dec. 31, 1940 |
| 2,425,353 | Spitzer | Aug. 12, 1947 |
| 2,471,687 | Holmes | May 31, 1949 |
| 2,491,042 | Hayot | Dec. 13, 1949 |
| 2,614,636 | Prewitt | Oct. 21, 1952 |
| 2,640,549 | Isacco | June 2, 1953 |
| 2,738,021 | Nagler | Mar. 13, 1956 |
| 2,969,211 | Saurma | Jan. 24, 1961 |

FOREIGN PATENTS

| 79,305 | Netherlands | Oct. 15, 1955 |
| 800,738 | France | May 11, 1936 |

OTHER REFERENCES

Aviation Week, Sept. 1, 1958, page 59.